United States Patent
Wakasugi

(10) Patent No.: US 11,737,513 B2
(45) Date of Patent: Aug. 29, 2023

(54) SHOE AND METHOD FOR MANUFACTURING SHOE

(71) Applicant: ASICS CORPORATION, Kobe (JP)

(72) Inventor: Shinsaku Wakasugi, Kobe (JP)

(73) Assignee: ASICS CORPORATION, Kobe (JP)

( * ) Notice: Subject to any disclaimer, the term of this patent is extended or adjusted under 35 U.S.C. 154(b) by 0 days.

(21) Appl. No.: 15/734,979

(22) PCT Filed: Dec. 25, 2019

(86) PCT No.: PCT/JP2019/050855
§ 371 (c)(1),
(2) Date: Dec. 3, 2020

(87) PCT Pub. No.: WO2021/130904
PCT Pub. Date: Jul. 1, 2021

(65) Prior Publication Data
US 2021/0368916 A1  Dec. 2, 2021

(51) Int. Cl.
*A43B 13/16* (2006.01)
*A43D 86/00* (2006.01)

(52) U.S. Cl.
CPC .............. *A43B 13/16* (2013.01); *A43D 86/00* (2013.01)

(58) Field of Classification Search
CPC .................................. A43B 13/16; A43B 9/18
See application file for complete search history.

(56) References Cited

U.S. PATENT DOCUMENTS

| 5,890,248 | A | * | 4/1999 | Gee ..................... | B29D 35/10 |
| | | | | | 12/146 B |
| 6,009,637 | A | * | 1/2000 | Pavone ................ | A43B 13/187 |
| | | | | | 36/28 |

(Continued)

FOREIGN PATENT DOCUMENTS

| CN | 110167749 A | 8/2019 |
| JP | 2000004908 A | 1/2000 |

(Continued)

OTHER PUBLICATIONS

International Search Report issued in PCT/JP2019/050855; dated Mar. 17, 2020.

(Continued)

*Primary Examiner* — Jila M Mohandesi
(74) *Attorney, Agent, or Firm* — Studebaker & Brackett PC

(57) ABSTRACT

A shoe comprises an upper and a sole. The sole includes: a midsole covering a lower surface of the upper, the midsole having an external surface having a facing region facing the upper and a non-facing region excluding the facing region; and an additional sole material covering a portion of the non-facing region. The midsole is provided with a notch reaching both the facing region and the non-facing region. The additional sole material has a body portion stuck to the non-facing region, a bonding portion stuck to both the upper and the midsole to bond them together, and an embedded portion embedded in the notch of the midsole. The body portion and the bonding portion are connected together via the embedded portion and thus integrated together such that the body portion and the bonding portion are spaced from each other in a thickness-wise direction of the midsole.

20 Claims, 10 Drawing Sheets

(56) References Cited

U.S. PATENT DOCUMENTS

| | | | | |
|---|---|---|---|---|
| 6,029,374 | A * | 2/2000 | Herr | A61F 2/66 36/179 |
| 6,787,089 | B2 * | 9/2004 | Liu | B29D 35/10 264/250 |
| 6,860,034 | B2 * | 3/2005 | Schmid | A43B 13/181 36/35 R |
| 7,707,745 | B2 * | 5/2010 | Schindler | A43B 21/28 36/35 B |
| 8,291,615 | B2 * | 10/2012 | Kita | A43B 13/143 36/27 |
| 8,657,979 | B2 * | 2/2014 | Dojan | B29D 35/122 156/245 |
| 9,788,598 | B2 * | 10/2017 | Reinhardt | A43B 13/16 |
| 2005/0132609 | A1 | 6/2005 | Dojan et al. | |
| 2009/0178300 | A1 | 7/2009 | Parker | |
| 2015/0013187 | A1 | 1/2015 | Taniguchi et al. | |
| 2015/0082668 | A1 | 3/2015 | Nonogawa et al. | |
| 2015/0216258 | A1 | 8/2015 | Ueda et al. | |
| 2018/0153252 | A1 | 6/2018 | Archer et al. | |
| 2018/0213886 | A1 | 8/2018 | Connell et al. | |

FOREIGN PATENT DOCUMENTS

| | | |
|---|---|---|
| JP | 2000270902 A | 10/2000 |
| WO | 2013121578 A1 | 8/2013 |
| WO | 2014115284 A1 | 7/2014 |

OTHER PUBLICATIONS

An Office Action mailed by China National Intellectual Property Administration dated Mar. 4, 2022, which corresponds to Chinese Patent Application No. 201980036763.2 and is related to U.S. Appl. No. 15/734,979; with English language translation.

The extended European search report issued by the European Patent Office dated Nov. 18, 2021, which corresponds to European Patent Application No. 19927570.2-1005 and is related to U.S. Appl. No. 15/734,979.

Communication pursuant to Article 94(3) EPC issued by the European Patent Office dated Aug. 29, 2022, which corresponds to European Patent Application No. 19927570.2-1015 and is related to U.S. Appl. No. 15/734,979.

* cited by examiner

SHOE AND METHOD FOR MANUFACTURING SHOE

TECHNICAL FIELD

The present invention relates to a shoe and a method for manufacturing the shoe.

BACKGROUND ART

Generally, a shoe comprises a sole provided with a tread, and an upper located above the sole and covering a portion of a foot on the side of the instep. The upper and the sole are often bonded together using an adhesive.

The operation of bonding the upper and the sole requires skill and it is currently, insufficiently mechanized and generally often performed manually. Therefore, it not only requires a high level of skill but also complicates the process and makes the manufacturing cost tight. For example, when the sole includes a midsole and an outsole, the bonding step includes two steps of bonding the upper and the midsole and bonding the midsole and the outsole, resulting in an increased manufacturing cost.

As one method for solving this problem, U.S. Patent Publication No. 2018/0153252 (PTL 1) discloses that an outsole defining a tread is formed by casting or injection molding, and in forming the outsole, a midsole serving as a core of a sole and an upper are bonded by a portion of the outsole.

More specifically, in the method for manufacturing a shoe disclosed in the publication, when forming the outsole, the midsole and the upper are set in a mold such that the upper is placed on the midsole, and the outsole is formed by casting or injection molding so as to wrap around the midsole's lower and peripheral surfaces, and in doing so, a portion of the outsole that wraps around the peripheral surface of the midsole reaches a peripheral surface of the upper and sticks thereto.

Manufacturing a shoe in such a manufacturing method allows the upper and the sole to be bonded together through a mechanized operation leading to a reduced manufacturing cost.

CITATION LIST

Patent Literature

PTL 1: U.S. Patent Publication No. 2018/0153252

SUMMARY OF INVENTION

Technical Problem

In the method for manufacturing a shoe disclosed in the above publication, however, the midsole basically has a peripheral surface entirely covered with the outsole, and there is a problem in that a cushioning function that the midsole has as its inherent function is impaired by the portion of the outsole covering the peripheral surface of the midsole. This is because while the outsole is excellent in terms of durability and the like, it is significantly inferior in flexibility to the midsole.

Accordingly, the present invention has been made in view of the above-described problem, and an object of the present invention is to allow a shoe to be manufactured at low cost without impairing a midsole's cushioning function.

Solution to Problem

A shoe according to the present invention comprises an upper and a sole located below the upper. The sole includes: a midsole covering a lower surface of the upper, the midsole having an external surface having a facing region facing the upper and a non-facing region excluding the facing region; and an additional sole material covering a portion of the non-facing region. The midsole is provided with a notch in the form of a throughhole or a groove reaching both the facing region and the non-facing region. The additional sole material has a body portion stuck to the non-facing region, a bonding portion stuck to both the upper and the midsole to bond the upper and the midsole together, and an embedded portion embedded in the notch of the midsole. In the shoe according to the present invention, the body portion and the bonding portion are connected together via the embedded portion and thus integrated together such that the body portion and the bonding portion are spaced from each other in a thickness-wise direction of the midsole.

A method for manufacturing a shoe according to the present invention comprises the steps of: preparing an upper; preparing a midsole provided with a notch in a form of a throughhole or a groove reaching both a facing region of an external surface of the midsole that is to face the upper and a non-facing region of the external surface of the midsole that is a portion excluding the facing region; preparing a molten material that will be an additional sole material covering a portion of the non-facing region of the external surface of the midsole; setting the upper and the midsole in a mold such that the upper has a lower surface covered with the midsole; forming the additional sole material by casting or injecting the molten material into a cavity in the mold and solidifying the molten material therein so that the additional sole material includes a body portion stuck to the non-facing region, a bonding portion sticking to both the upper and the midsole to bond the upper and the midsole together, and an embedded portion embedded in the notch of the midsole. In the method for manufacturing a shoe according to the present invention, in the step of forming the additional sole material, the body portion and the bonding portion are connected via the embedded portion and thus integrated together such that the body portion and the bonding portion are spaced from each other in a thickness-wise direction of the midsole.

Advantageous Effects of Invention

The present invention allows a shoe to be manufactured at low cost without impairing a cushioning function of a midsole.

DESCRIPTION OF EMBODIMENTS

Hereinafter, embodiments of the present invention will be described in detail with reference to the accompanying drawings. In the following embodiments, identical or common portions are identically denoted in the figures, and will not be described repeatedly.

First Embodiment

Figure 1:
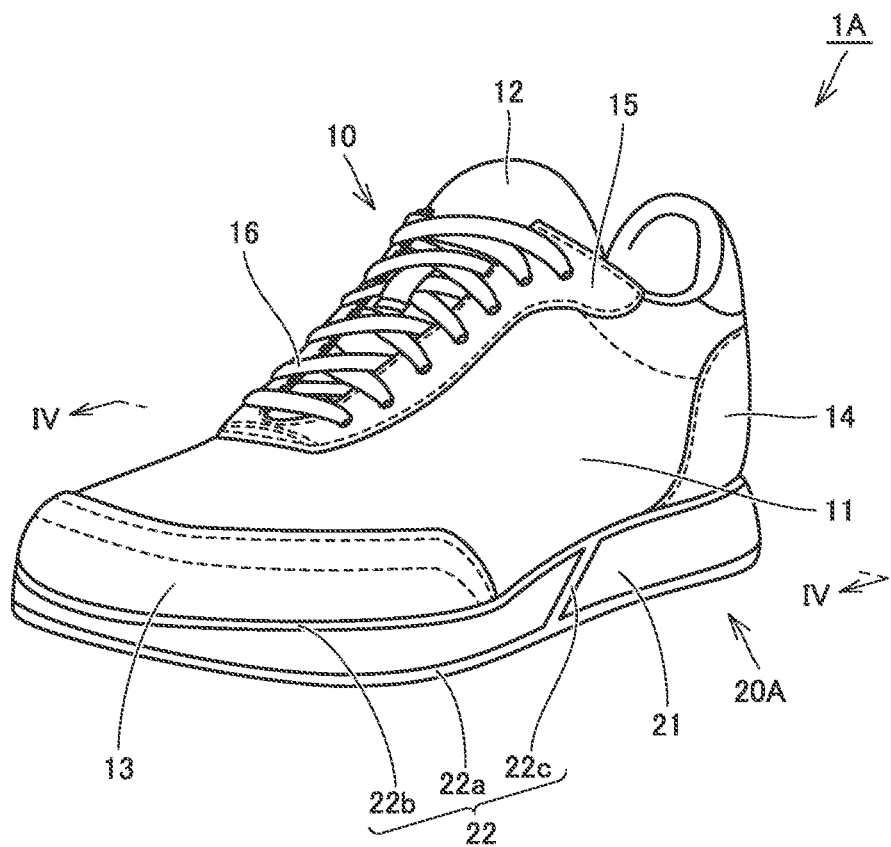
FIG. 1 is a perspective view of a shoe according to a first embodiment.
Figure 2:
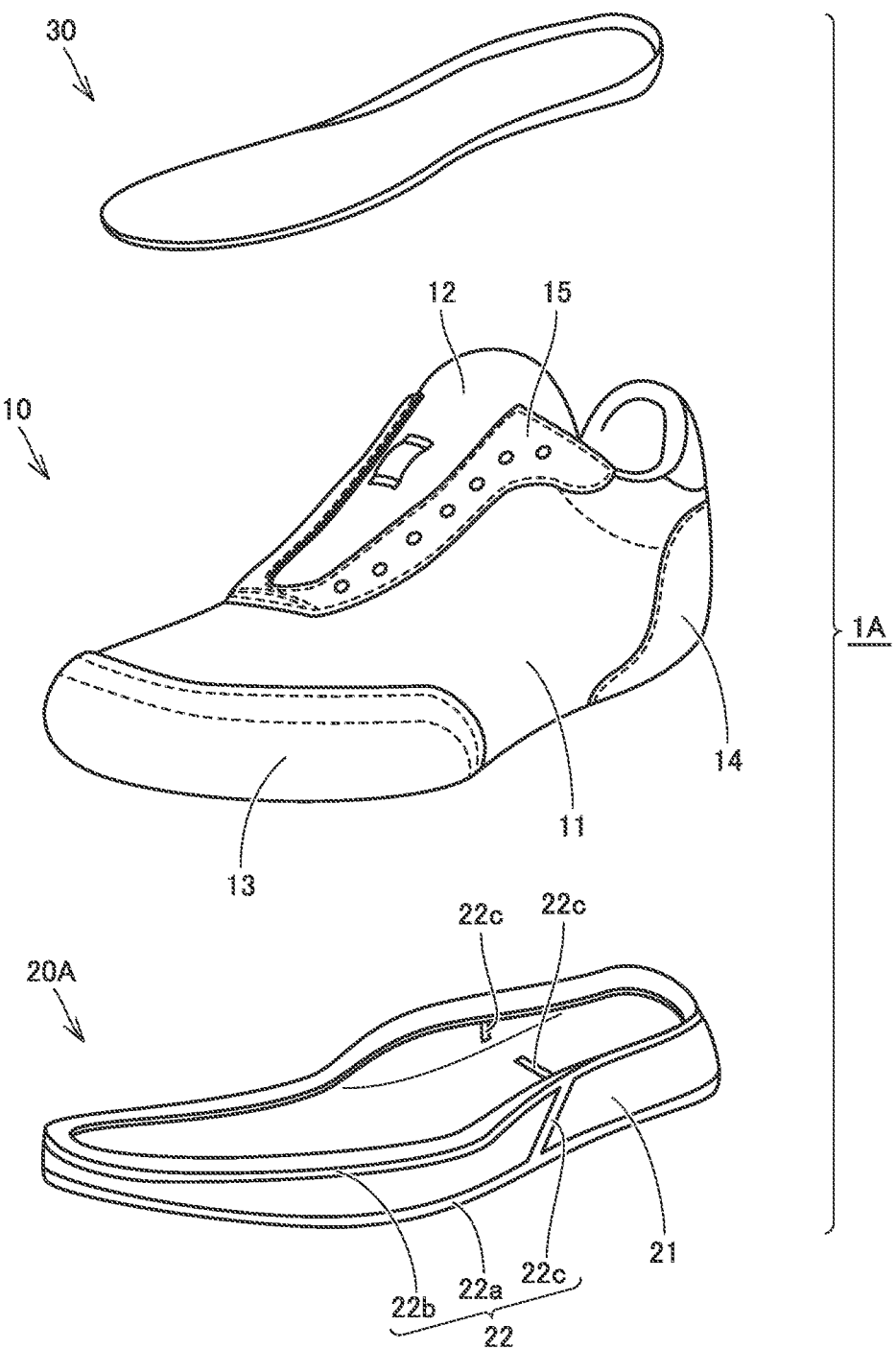
FIG. 2 is an exploded perspective view of the shoe shown in FIG. 1.

FIG. 1 is a perspective view of a shoe according to a first embodiment, and FIG. 2 is an exploded perspective view of the shoe. Initially, a schematic configuration of a shoe 1A according to the present embodiment will be described with reference to FIGS. 1 and 2.

As shown in FIGS. 1 and 2, shoe 1A includes an upper 10, a sole 20A, and a sockliner 30. Upper 10 has a shape that at least covers the entirety of a portion of an inserted foot located on the side of the instep. Sole 20A is positioned below upper 10 to cover the sole of the foot. Sockliner 30 is accommodated inside upper 10 so as to cover an internal bottom surface of upper 10.

Upper 10 includes a body 11, a tongue 12, a toe-side reinforcing portion 13, a heel-side reinforcing portion 14, an eyelet reinforcing portion 15, and a shoelace 16. Of these components, tongue 12, toe-side reinforcing portion 13, heel-side reinforcing portion 14, eyelet reinforcing portion 15, and shoelace 16 are all fixed to or attached to body 11.

Body 11 has an upper portion provided with an upper opening which exposes an upper portion of an ankle and a portion of the instep of a foot. Body 11 has a lower portion provided with a lower opening covered with sole 20A as an example and has a lower end French-seamed to form a bottom portion as another example. When body 11 has the lower portion provided with the bottom portion, sock-knitting, circular knitting or the like, rather than French-seaming, may be employed to previously form body 11 entirely in the form a bag.

Tongue 12 is fixed to body 11 by sewing, welding, adhesion, or a combination thereof so as to cover a portion of the upper opening provided to body 11 that exposes a portion of the instep of a foot. As body 11 and tongue 12, woven fabric, knitted fabric, nonwoven fabric, synthetic leather, resin, or the like is used for example, and for a shoe required to be air permeable and lightweight, in particular, a double raschel warp knitted fabric with a polyester yarn knitted therein is used.

Toe-side reinforcing portion 13 and heel-side reinforcing portion 14 are provided to reinforce a portion of body 11 that is required to have durability, in particular, that is, a portion of body 11 covering the toes of a foot and a portion of body 11 covering the heel of the foot, and are positioned so as to cover an external surface of these portions of body 11.

As well as toe-side reinforcing portion 13 and heel-side reinforcing portion 14, eyelet reinforcing portion 15 is provided to reinforce a portion of body 11 that is required to have durability, in particular, that is, a periphery of the upper opening of body 11 that exposes a portion of the instep of a foot (that is, a portion to which shoelace 16 is attached), and eyelet reinforcing portion 15 is positioned so as to cover an external surface of that portion of body 11.

Toe-side reinforcing portion 13, heel-side reinforcing portion 14, and eyelet reinforcing portion 15 are formed for example of woven fabric, knitted fabric, nonwoven fabric, synthetic leather, resin, or the like fixed to an external surface of body 11 by sewing, welding, adhesion, or a combination thereof.

Shoelace 16 is composed of a member in the form of a string for drawing portions of the periphery of the upper opening provided to body 11 and exposing a portion of the instep of a foot together in the direction of the width of the foot, and shoelace 16 is passed through a plurality of holes provided through the periphery of the upper opening. When a foot is inserted in body 11 and shoelace 16 is tightened, body 11 can be brought into close contact with the foot.

Sole 20A includes a midsole 21, and an outsole 22 as an additional sole material. Midsole 21 and outsole 22 have a generally flat shape as they are integrated together. Midsole 21 covers a lower surface of upper 10 and outsole 22 covers a portion of midsole 21.

More precisely, in the present embodiment, as will be described hereinafter, by forming outsole 22 by casting or injection molding, not only midsole 21 and outsole 22 but also upper 10 and sole 20A are all integrated together, and this point and a specific structure of sole 20A will described hereinafter.

Sole 20A may have an insole (not shown) in addition to midsole 21 and outsole 22 described above. When sole 20A has an insole, the insole is attached to body 11 so as to cover the lower opening of body 11, or attached to body 11 so as to cover a bottom portion formed by French-seaming a lower end of body 11.

More specifically, the insole is a portion fixed to body 11 by sewing or the like and also fixed to an upper surface of midsole 21. The insole is formed for example of a foam material made of a resin including a woven fabric, a knitted fabric or a nonwoven fabric composed of synthetic resin fiber such as polyester, or a resin material as a main component, and a foaming agent, a crosslinking agent and/or the like as a subcomponent.

Sockliner 30 is accommodated inside upper 10, as described above, and is detachably attached to an inner bottom surface of upper 10 or fixed to the inner bottom surface of upper 10 by welding, adhesion, or the like. Sockliner 30 is formed for example of a foam material made of a resin including a woven fabric, a knitted fabric or a nonwoven fabric composed of synthetic resin fiber such as polyester, or a resin material as a main component, and a foaming agent, a crosslinking agent and/or the like as a subcomponent, and is arranged to comfortably fit a foot. Sockliner 30 is not essential and may be dispensed with.

Herein, with reference to the front end of sole 20A, when a position corresponding to a dimension of 40% of a dimension of sole 20A in a longitudinal direction of sole 20A from the front end is defined as a first boundary position, and a position corresponding to a dimension of 80% of the dimension of sole 20A in the longitudinal direction of sole 20A from the front end is defined as a second boundary position, a portion included between the front end and the first boundary position in the longitudinal direction will be referred to as a front foot portion of sole 20A, a portion included between the first boundary position and the second boundary position in the longitudinal direction will be referred to as a middle foot portion of sole 20A, and a portion included between the second boundary position and the rear end of sole 20A in the longitudinal direction will be referred to as a rear foot portion of sole 20A.

In that case, the front foot portion of sole 20A corresponds to a portion supporting the toes and ball of a foot, the middle foot portion of sole 20A corresponds to a portion supporting the arch of the foot, and the rear foot portion of sole 20A corresponds to a portion supporting the heel of the foot.

Furthermore, a medial side of the foot in anatomical position (that is, a side closer to the median) will be referred to as a medial foot side, and a lateral side of the foot in anatomical position (that is, a side farther from the median) will be referred to as a lateral foot side.

Figure 3:
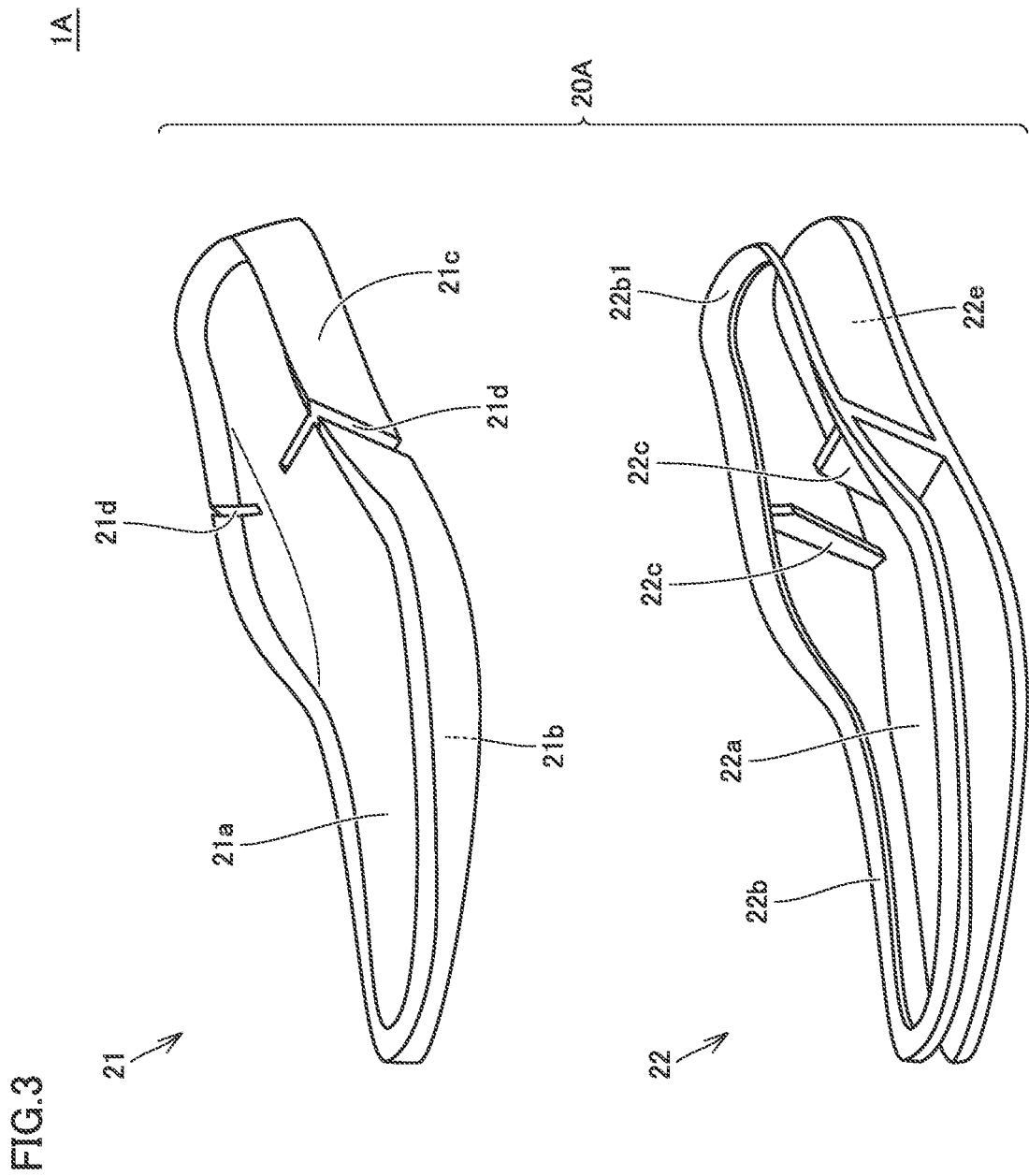
FIG. 3 is a schematic perspective view showing a structure of a sole of the shoe shown in FIG. 1.
Figure 4:
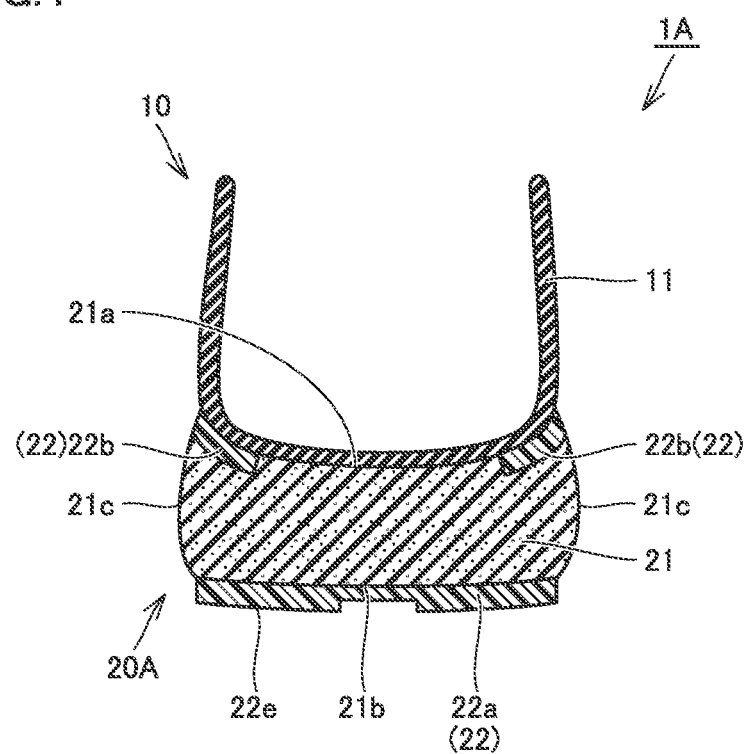
FIG. 4 is a schematic cross section of the shoe shown in FIG. 1.

FIG. 3 is a schematic perspective view of a structure of the sole of the shoe according to the present embodiment, and FIG. 4 is a schematic cross section of the shoe taken along a line IV-IV shown in FIG. 1. Hereinafter, a specific structure of sole 20A of shoe 1A according to the present embodiment will be described with reference to FIGS. 3 and 4 and FIGS. 1 and 2. Although midsole 21 and outsole 22 are integrated together, as has been described above, FIG. 3 schematically shows midsole 21 and outsole 22 by extracting midsole 21 and outsole 22 individually from sole 20A of shoe 1A according to the present embodiment.

Referring to FIGS. 1 to 4, sole 20A includes midsole 21 and outsole 22, as has been described above, and is configured by integrating midsole 21 and outsole 22 together. Outsole 22 is provided so as to cover a portion of an external surface of midsole 21, and is stuck to midsole 21 at a boundary portion between outsole 22 and midsole 21.

As shown in FIGS. 3 and 4, midsole 21 has an external shape generally in the form of an elongated plate having an upper surface 21a, a lower surface 21b, and a peripheral surface 21c. Upper surface 21a of midsole 21 defines a facing region facing upper 10, and lower surface 21b and peripheral surface 21c of midsole 21 define a portion excluding the facing region, or a non-facing region.

Midsole 21 is provided with a groove-shaped notch 21d reaching both the facing region or upper surface 21a and the non-facing region or lower surface 21b (see FIG. 3 in particular). In the present embodiment, notch 21d is provided to the middle foot portion of sole 20A at each of an edge portion on the medial foot side and an edge portion on the lateral foot side.

Outsole 22 has a three-dimensional shape including a body portion 22a, a bonding portion 22b, and an embedded portion 22c, and body portion 22a, bonding portion 22b, and embedded portion 22c are all stuck to an external surface of midsole 21.

Body portion 22a is located below midsole 21 and has an external shape generally in the form of an elongated plate covering lower surface 21b of midsole 21. Body portion 22a has a lower surface, which defines a tread 22e, and tread 22e may have an exposed surface provided with protrusions and depressions to have a tread pattern to have enhanced grip.

Bonding portion 22b is located on the side of upper surface 21a of midsole 21 and includes a generally annular surrounding portion 22b1 covering the periphery of upper surface 21a of midsole 21. Bonding portion 22b is interposed between the periphery of the bottom portion of upper 10 and the periphery of upper surface 21a of midsole 21, and thereby stuck to the lower surface of upper 10 and upper surface 21a of midsole 21 and thus bonds upper 10 and midsole 21 together (see FIG. 4 in particular).

Embedded portion 22c is located inside notch 21d that is provided to midsole 21 so as to fill notch 21d. Embedded portion 22c is provided to the middle foot portion of sole 20A at each of an edge portion on the medial foot side and an edge portion on the lateral foot side, and is exposed at the peripheral surface of midsole 21 (see FIGS. 1 and 2).

Body portion 22a and bonding portion 22b are connected via embedded portion 22c. That is, body portion 22a and bonding portion 22b are connected by embedded portion 22c and thus integrated together such that they are spaced from each other in the thickness-wise direction of midsole 21.

Herein, midsole 21 preferably has an appropriate strength and also has an excellent cushioning property, and from this viewpoint, for example, a foam material made of a resin including a resin material as a main component and a foaming agent, a crosslinking agent and/or the like as a subcomponent is used as midsole 21. Alternatively, a foam material made of rubber including a rubber material as a main component and a plasticizer, a foaming agent, a reinforcing agent, and/or a crosslinking agent as subcomponents may be used.

As the resin material, thermoplastic resin and thermosetting resin can be used, and as the thermoplastic resin, an ethylene-vinyl acetate copolymer (EVA) can be suitably used for example, and as the thermosetting resin, polyurethane (PU) can be suitably used for example. As the rubber material, butadiene rubber can be suitably used for example.

Outsole 22 preferably has excellent wear resistance and excellent grip, and from this viewpoint, for example, a resin material including a thermoplastic resin as a main component is preferably used as a material for outsole 22. As the resin material, an ethylene-vinyl acetate copolymer (EVA) can be suitably used for example.

Thus, midsole 21 is configured by a member which generally has a Young's modulus smaller than that of outsole 22 and is softer than outsole 22, and outsole 22 is configured by a member which generally has a Young's modulus larger than that of midsole 21 and is harder than midsole 21.

Midsole 21 is formed of a foam material made of resin or a foam material made of rubber, as has been described above, and can be formed, for example, by casting or injection molding using a resin material or a rubber material as a raw material. Outsole 22 is also composed of a resin material, as has been described above, and can be formed for example by casting or injection molding using a resin material as a raw material, for example. More specifically, in the present embodiment, outsole 22 is formed by injection molding using as a raw material a resin material including thermoplastic resin as a main component.

Herein, in the present embodiment, sole 20A has a shape such that upper surface 21a of midsole 21 defining the upper surface of sole 20A has a peripheral edge portion raised as compared with a portion therearound, and thereby upper surface 21a has a central portion provided with a recessed portion. The recessed portion is a portion for receiving upper 10, and a bottom surface of the recessed portion, or upper surface 21a excluding the peripheral edge portion, has a shape of a smooth curved surface so as to fit the shape of the sole of a foot. Upper surface 21a of midsole 21 is not necessarily provided with a recessed portion as described above, and may have a flat shape.

Figure 5:
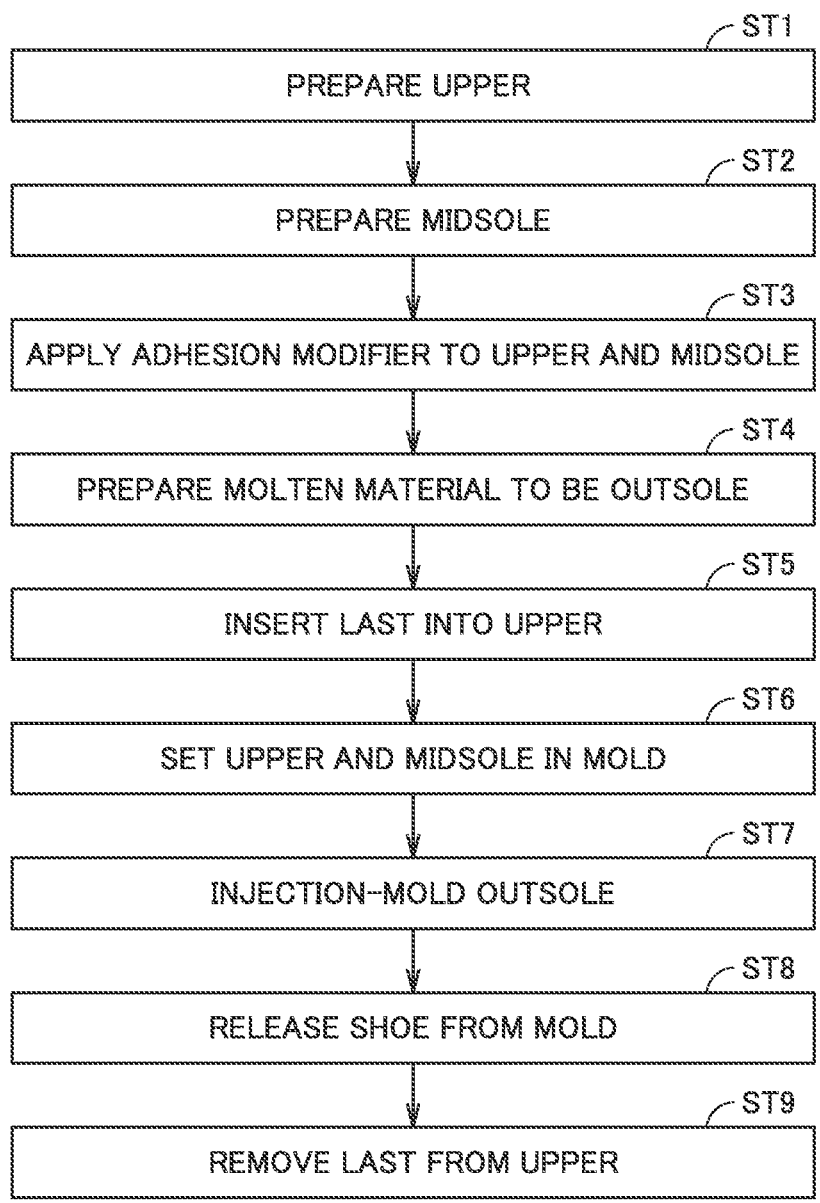
FIG. 5 is a flowchart of a method for manufacturing a shoe according to the first embodiment.
Figure 6:
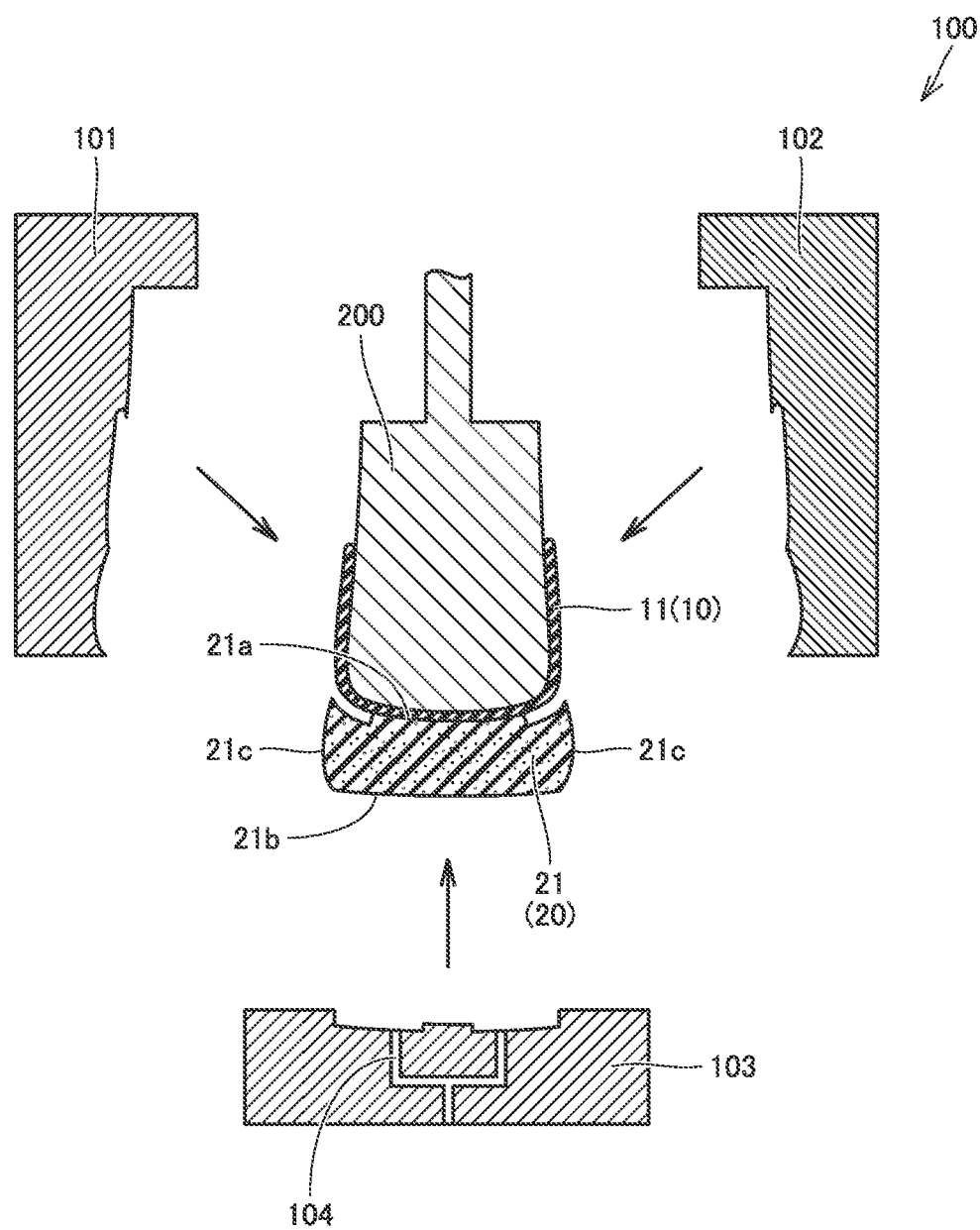
FIG. 6 is a schematic cross section showing the step of setting an upper and a midsole in a mold in the method for manufacturing the shoe shown in FIG. 5.
Figure 7:
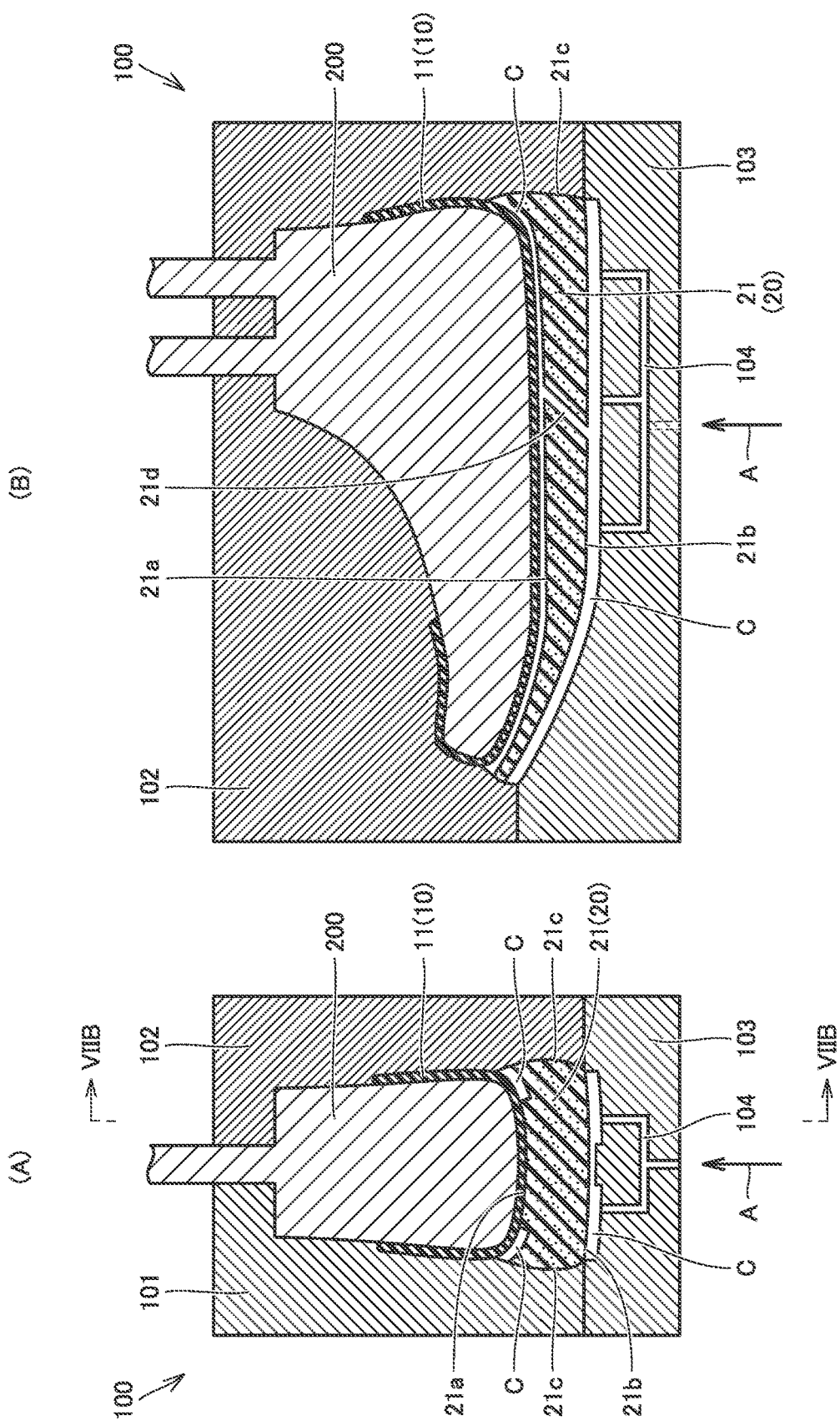
FIG. 7 is a schematic cross section showing a state in the method for manufacturing the shoe shown in FIG. 5 after the step of setting an upper and a midsole in a mold is completed
Figure 8:
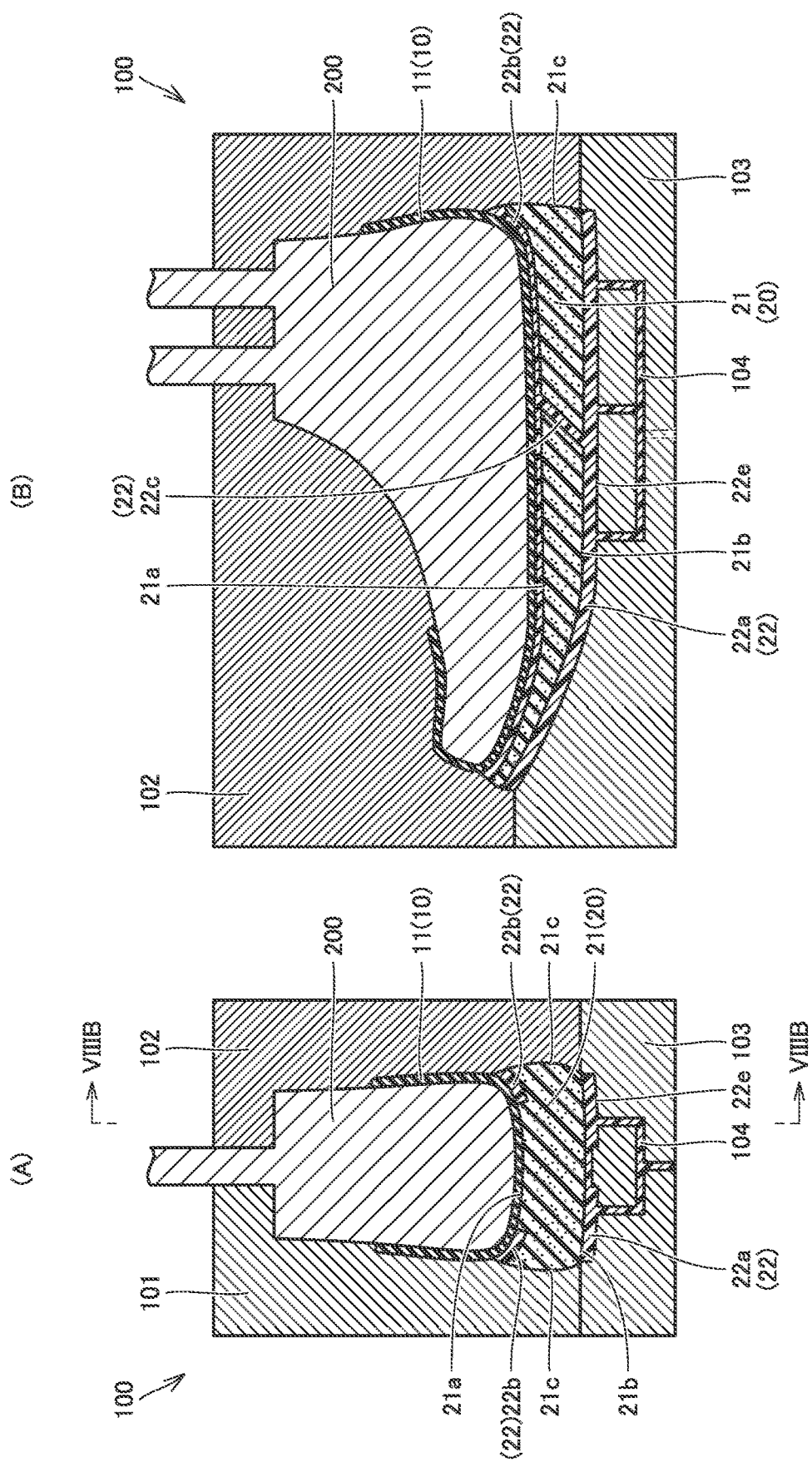
FIG. 8 is a schematic cross section showing the step of injection molding the outsole in the method for manufacturing the shoe shown in FIG. 5.

FIG. 5 is a flowchart showing a method for manufacturing a shoe according to the present embodiment. FIG. 6 is a schematic cross section showing the step of setting the upper and the midsole in a mold in the method for manufacturing a shoe according to the present embodiment, and FIG. 7 is a schematic cross section showing a state after the step shown in FIG. 5 is completed. FIG. 8 is a schematic cross section showing the step of injection molding the outsole in the method for manufacturing a shoe according to the present embodiment. Hereinafter, the method for manufacturing a shoe according to the present embodiment will be described with reference to FIGS. 5 to 8.

Shoe 1A according to the present embodiment can be manufactured according to the manufacturing flow shown in FIG. 5. Hereinafter, the manufacturing flow will be described for each step.

Initially, as shown in FIG. 5, in step ST1, upper 10 is prepared, and in step ST2, midsole 21 is prepared. Specifically, upper 10 is prepared by cutting a fabric or the like serving as a raw material for body 11 into a predetermined shape, three-dimensionally forming the fabric or the like, and bonding portions thereof, as required, together by sawing, welding, adhesion, or a combination thereof. Note that when the entire body 11 is previously formed in a bag by sock knitting, circular knitting, or the like, the sawing or the like is dispensed with. Midsole 21 is formed, for example, by casting, injection molding or the like using a resin material or a rubber material as a raw material, or press forming or the like.

Subsequently, in step ST3, an adhesion modifier is applied to upper 10 and midsole 21. The adhesion modifier is used to enhance adhesion between outsole 22, and upper 10 and midsole 21 in injection molding outsole 22 as will be described hereinafter. Therefore, in step ST3, the adhesion modifier is preferably applied throughout the area of the external surface of the portion of upper 10 and midsole 21 to which outsole 22 is stuck.

As a method for enhancing adhesion, a variety of methods can be used other than applying the adhesion modifier as described above. For example, an adhesion modifier in the form of a sheet configured to be stickable may be used, or an adhesion modifier may previously be included in a raw material for upper 10 and midsole 21. Further, upper 10 and midsole 21 may have a surface modified by plasma irradiation. Such a step for enhancing adhesion is not essential, however, and may be dispensed with.

Subsequently, in step ST4, a molten material to be outsole 22 is prepared. Herein, the molten material prepared is a melt of resin serving as a raw material for outsole 22. The step of preparing the molten material may be performed at any time before the step of injection molding outsole 22 as will be described hereinafter.

Note that not only step ST4 but also the above-described preparation steps including steps ST1 and ST2 may be performed at any time before the step of injection molding outsole 22 as will be described hereinafter, and an order in which the steps are performed may also be changed as appropriate.

Subsequently, in step ST5, a last 200 (see FIG. 6 or the like) is inserted into upper 10. Last 200 is used to shape upper 10 into a shape of a final product thus maintain it, and serves as a model in shape of a foot. The step of inserting last 200 into upper 10 may be performed at any time before the step of setting upper 10 and midsole 21 in mold 100, as will be described hereinafter (see FIG. 6 and the like).

Subsequently, in step ST6, upper 10 and midsole 21 are set in mold 100, and in step ST7, outsole 22 is injection molded. This series of steps is carried out for example by an injection molding machine equipped with a mold 100 shown in FIGS. 6 to 8.

As shown in FIG. 6, mold 100 of the injection molding machine is divided for example into first to third mold parts 101 to 103. First mold part 101 is mainly applied in injection molding to a portion of upper 10 on the lateral foot side, and second mold part 102 is mainly applied in injection molding to a portion of upper 10 on the medial foot side. Third mold part 103 is applied in injection molding to midsole 21 disposed below upper 10. A gate 104 provided in mold 100 and serving a port for injecting a molten material is provided in third mold part 103 preferably as shown in the figure.

In the step of setting upper 10 and midsole 21 in mold 100, initially, midsole 21 is provisionally fixed to upper 10 so as to cover a lower surface of upper 10 having last 200 inserted therein, and subsequently, upper 10 having last 200 inserted therein and midsole 21 provisionally fixed thereto is sandwiched by first to third mold parts 101 to 103.

Herein, midsole 21 is provisionally fixed to upper 10 for example in such a manner that a portion of the facing region of midsole 21, or upper surface 21a, that is never covered with bonding portion 22b of outsole 22 described hereinafter and a lower surface of upper 10 at a portion facing it are fixed together with a double-sided tape, an adhesive tape, an adhesive agent, or the like.

Upper 10 is sandwiched by first to third mold parts 101 to 103, as follows: first to third mold parts 101 to 103 are disposed to surround upper 10 having last 200 inserted therein and midsole 21 provisionally fixed thereto and are driven by a driving mechanism in a direction shown in FIG. 6 and indicated by an arrow.

Thus, as shown in FIGS. 7(A) and 7(B), in a state after upper 10 and midsole 21 have been set in mold 100, while last 200, upper 10 and midsole 21 occupy a major portion of a space inside first to third mold parts 101 to 103, a cavity C having a predetermined shape is formed around upper 10 and midsole 21. Cavity C is in communication with gate 104 provided in third mold part 103. FIG. 7(B) shows a cross section taken along a line VIIB-VIIB shown in FIG. 7(A).

In the step of injection molding outsole 22, the molten material to be outsole 22 is injected toward cavity C through gate 104 (see an arrow A shown in FIGS. 7(A) and 7(B)). Thus, cavity C is filled with the molten material.

In doing so, as shown in FIGS. 8(A) and 8(B), the molten material injected through gate 104 into first to third mold parts 101 to 103 reaches a portion to be bonding portion 22b of outsole 22 from a portion to be body portion 22a of outsole 22 through a portion to be embedded portion 22c of outsole 22. FIG. 8(B) shows a cross section taken along a line VIIIB-VIIIB shown in FIG. 8(A).

Thereafter, the molten material is cooled by first to third mold parts 101 to 103 and thus solidified to form outsole 22. When outsole 22 is thus formed, at a portion of outsole 22 that comes into contact with upper 10 and midsole 21, outsole 22 sticks to them.

Therefore, in particular, upper 10 and midsole 21 are bonded together at bonding portion 22b of outsole 22 that is a portion interposed between upper 10 and midsole 21. Thus, by forming outsole 22 by injection molding, not only midsole 21 and outsole 22 but also upper 10 and sole 20A are all integrated together.

Subsequently, as shown in FIG. 5, in step ST8, shoe 1A formed by integrating upper 10 and sole 20A together is released from mold 100, and thereafter, in step ST9, last 200 is removed from upper 10. Thus, an operation of integrating upper 10 and sole 20A together is all completed.

As described above, shoe 1A according to the present embodiment or manufacturing a shoe in the method for manufacturing a shoe according to the present embodiment allows upper 10 and sole 20A to be bonded together through a mechanized operation and can thus reduce the cost for manufacturing the shoe. Note that reducing the cost for manufacturing the shoe includes reducing time, personnel, a working space, and the like for manufacturing the shoe.

Further, sole 20A does not have a peripheral surface substantially covered with outsole 22 and instead has the peripheral surface substantially entirely covered with midsole 21 (that is, midsole 21 is exposed), and a cushioning function that midsole 21 has as its inherent function is sufficiently exhibited.

Therefore, shoe 1A according to the present embodiment or manufacturing a shoe in the method for manufacturing a shoe according to the present embodiment allows a shoe to be manufactured at low cost without impairing the cushioning function of midsole 21.

According to the present embodiment, upper 10 and sole 20A can be bonded together through a mechanized operation, and stable quality can also be obtained as a secondary effect. In addition, according to the present embodiment, a surface of midsole 21 for design is exposed, and an increased degree of freedom in designing in terms of design is also obtained as a secondary effect.

In shoe 1A according to the present embodiment, as has been described above, bonding portion 22b of outsole 22 includes generally annular surrounding portion 22b1 provided so as to surround the shoe along a periphery of a boundary portion between upper 10 and midsole 21. This configuration can effectively suppress peeling at an end portion of the boundary portion between upper 10 and sole 20A and can also increase strength of bonding upper 10 and midsole 21 for the shoe as a whole, and the shoe can have excellent durability.

In shoe 1A according to the present embodiment, as has been described above, embedded portion 22c of outsole 22 is provided at the middle foot portion of sole 20A, and furthermore, embedded portion 22c includes a portion in the form of an inclined plate as shown in FIG. 3. In such a configuration, a portion having a so-called truss structure formed of outsole 22 having larger rigidity than midsole 21 can be formed at a prescribed position in the middle foot portion of sole 20A. This can suppress twisting of the sole in motion. Instead of the portion having the truss structure, a portion having a so-called spring structure may be provided to sole 20A as embedded portion 22c.

Further, in the present embodiment, outsole 22 is formed by injection molding in a state with last 200 inserted in upper 10. This can suppress deformation of upper 10 and midsole 21 during injection molding, and outsole 22 can be formed with high precision.

(First to Third Variations)

Figure 9:
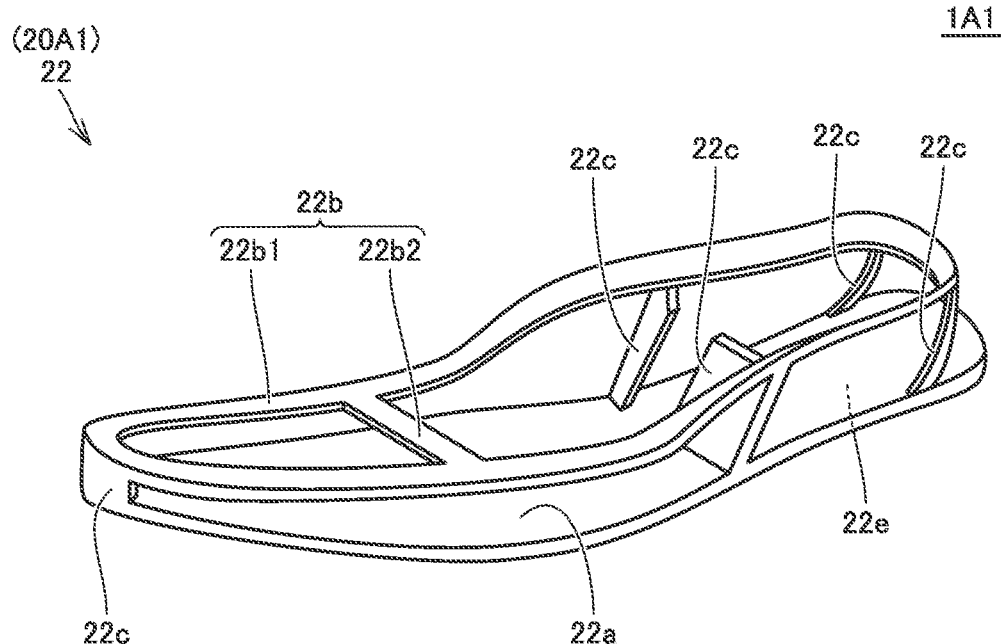
FIG. 9 is a schematic perspective view showing an outsole alone extracted from a sole of a shoe according to a first variation.
Figure 10:
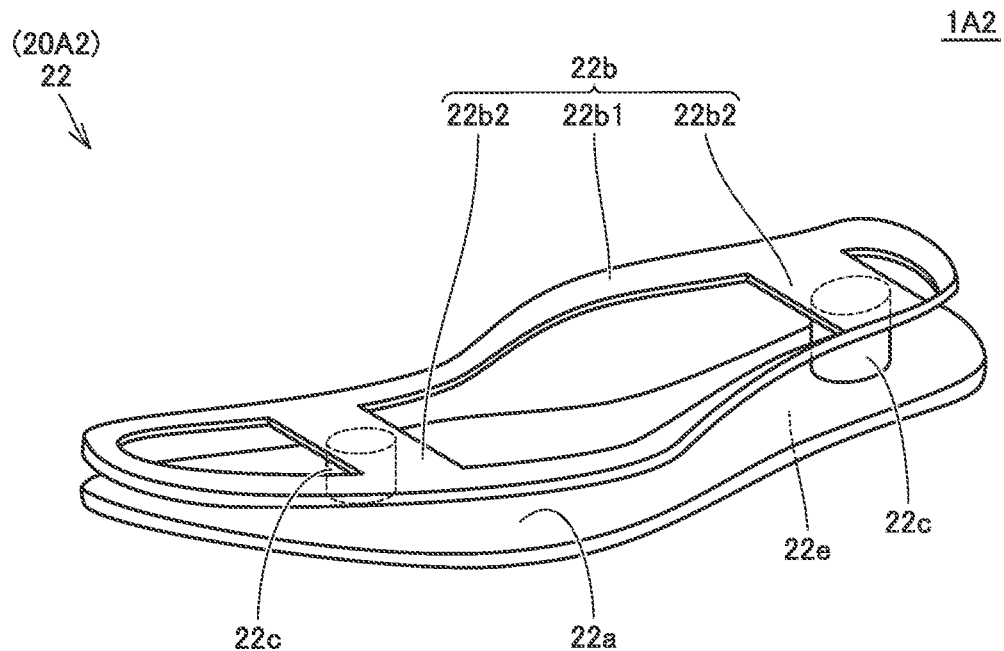
FIG. 10 is a schematic perspective view showing an outsole alone extracted from a sole of a shoe according to a second variation.
Figure 11:
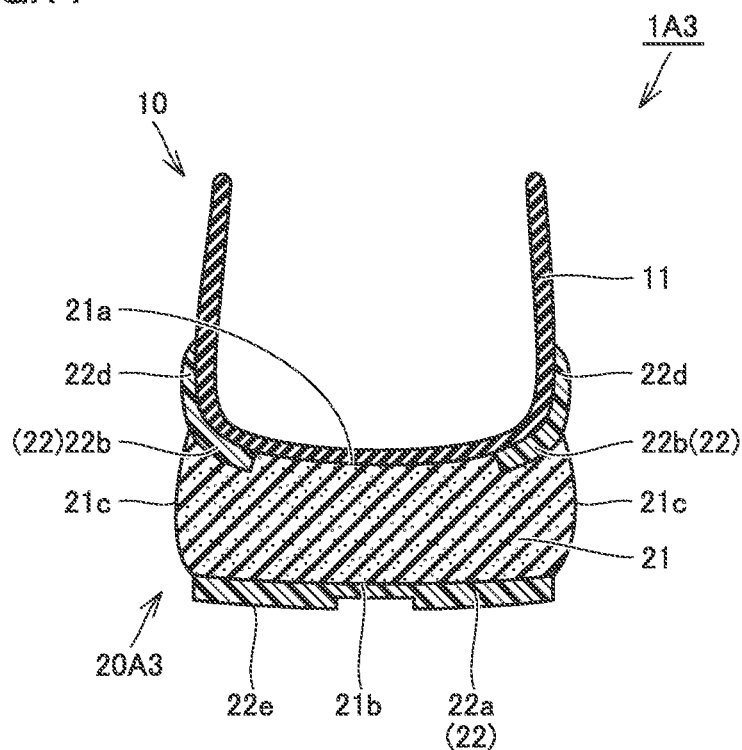
FIG. 11 is a schematic cross section of a shoe according to a third variation.

FIG. 9 is a schematic perspective view showing an outsole alone extracted from a sole of a shoe according to a first variation and FIG. 10 is a schematic perspective view showing an outsole alone extracted from a sole of a shoe according to a second variation. FIG. 11 is a schematic cross section of a shoe according to a third variation. Hereinafter, shoes 1A1 to 1A3 according to the first to third variations based on the first embodiment will be described with reference to FIGS. 9 to 11.

As shown in FIG. 9, shoe 1A1 according to the first variation differs from shoe 1A according to the first embodiment only in that shoe 1A1 has a sole 20A1 having a different structure. As well as sole 20A described above, sole 20A1 has a midsole (not shown) and outsole 22, and outsole 22 has a shape as shown in FIG. 9 depending on the shape of the midsole.

More specifically, the front foot portion of the midsole (not shown) of sole 20A1 has at a predetermined position on the side of its upper surface (that is, a surface of the midsole that faces upper 10, or the facing region) a recess extending in the direction of the width of a foot, and bonding portion 22b of outsole 22 is provided with a bridge portion 22b2 that bridges a portion of generally annular surrounding portion 22b1 and another portion thereof.

Further, the midsole (not shown) of sole 20A1 has a peripheral surface with a middle foot portion provided with a pair of notches and, in addition, a front end (that is, the tip of a front foot portion) and a rear foot portion provided with a plurality of notches each in the form of a groove, and outsole 22 is provided with five embedded portions 22c in total from the front foot portion to the rear foot portion.

In shoe 1A1 according to the first variation configured as described above, bridge portion 22b2 is provided to bonding portion 22b and thus enhances strength of bonding upper 10 and sole 20A1 more than the first embodiment described above. Further, shoe 1A1 according to the first variation configured as described above allows injection molding to be performed with a molten material spread more easily throughout cavity C as bridge portion 22b2 is provided and an increased number of embedded portions 22c are provided, resulting in better moldability.

As shown in FIG. 10, shoe 1A2 according to the second variation differs from shoe 1A according to the first embodiment only in that shoe 1A2 has a sole 20A2 having a different structure. As well as sole 20A, sole 20A2 has a midsole (not shown) and outsole 22, and outsole 22 has a shape as shown in FIG. 10 depending on the shape of the midsole.

More specifically, the front and rear foot portions of the midsole (not shown) of sole 20A2 each have at a predetermined position on the side of its upper surface (that is, a surface of the midsole that faces upper 10, or the facing region) a recess extending in the direction of the width of a foot, and bonding portion 22b of outsole 22 is provided with two bridge portions 22b2 that bridge generally annular surrounding portion 22b1.

Further, the front and rear foot portions of the midsole (not shown) of sole 20A1 are each provided with a notch in the form of a throughhole extending in the thickness-wise direction of the midsole through to the recess described above, and outsole 22 is provided with two cylindrical embedded portions 22c connecting body portion 22a and bonding portion 22b together.

As two cylindrical embedded portions 22c are provided, the middle foot portion of the midsole (not shown) of sole 20A1 is not provided with the pair of notches each in the form of a groove that sole 20A has, and accordingly, outsole 22 is not provided with the two embedded portions 22c each formed of a portion in the form of an inclined plate that sole 20A has.

Therefore, in shoe 1A2 according to the second variation configured as described above, sole 20A2 has a peripheral surface uncovered with outsole 22 and instead entirely covered with midsole 21 (that is, midsole 21 is exposed). The shoe thus allows a cushioning function that midsole 21 has as its inherent function to be sufficiently exhibited.

Furthermore, in shoe 1A2 according to the second variation configured as described above, two bridge portions 22b2 are provided to bonding portion 22b and thus enhance strength of bonding upper 10 and sole 20A1 more than the first embodiment described above. Further, shoe 1A2 according to the second variation configured as described above allows injection molding to be performed with a molten material spread more easily throughout cavity C as two bridge portions 22b2 are provided and two embedded portions 22c each in the form of a cylinder having a large external shape, rather than two embedded portions 22c each in the form of an inclined plate having a small external shape, are provided, resulting in better moldability.

As shown in FIG. 11, shoe 1A3 according to the third variation differs from shoe 1A according to the first embodiment only in that the former comprises a sole 20A3 having a different structure. As well as sole 20A, sole 20A3 has midsole 21 and outsole 22. Midsole 21 is similar in shape to that of the first embodiment.

For shoe 1A3 according to the third variation, cavity C defined by first and second mold parts 101 and 102 (see FIGS. 6 to 8) is changed in shape, and accordingly, outsole 22 has bonding portion 22b with a periphery extended by a prescribed amount along an external surface of body 11 toward the upper end of upper 10. The extended portion of outsole 22 functions as a reinforcing portion 22d covering body 11.

Thus, shoe 1A3 according to the third variation configured as described above allows body 11 to have a portion, as required, reinforced by reinforcing portion 22d that is a portion extending from bonding portion 22b of outsole 22, and a shoe having high durability can be easily and inexpensively manufactured. Note that reinforcing portion 22d may be provided all the way around a periphery of the shoe or may be provided only at a portion of the periphery of the shoe. Reinforcing portion 22d formed of outsole 22 can be an alternative to toe-side reinforcing portion 13 and heel-side reinforcing portion 14.

As has been described above, bonding portion 22b and embedded portion 22c that form a portion of outsole 22 can be variously changed in shape. For example, bonding portion 22b is not limited to having bridge portion 22b2 described above and may have a portion in the form of a mesh or a portion in the form of a line of dots. Furthermore, embedded portion 22c is not limited to having the above-described shape and may have any shape such as a non-inclined plate, a polygonal column, an elliptical column, a truncated cone, or a truncated polygonal pyramid.

Embedded portion 22c may be provided in at least one of the front foot portion, the middle foot portion, and the rear foot portion, and more preferably, one or more embedded portions 22c are provided in each of the front foot portion, the middle foot portion, and the rear foot portion. One or more embedded portions provided in each of the front foot portion, the middle foot portion, and the rear foot portion allow injection molding to be performed with a molten material better spread, and moldability to be improved.

Herein, according to the present invention, the configuration of shoe 1A as described in the first embodiment and those of shoes 1A1 to 1A3 as described in the first to third variations can be easily implemented without changing the mold. That is, when the shape of the midsole is changed, the shape of the outsole will accordingly, spontaneously be changed, and it is unnecessary to separately prepare a mold for forming the outsole. Thus, the present invention allows a variety of types of shoes having a different types of configurations to be manufactured without individually preparing molds, and shoes of various configurations (that is, products of various product lineups) to be manufactured inexpensively.

Second Embodiment

Figure 12:
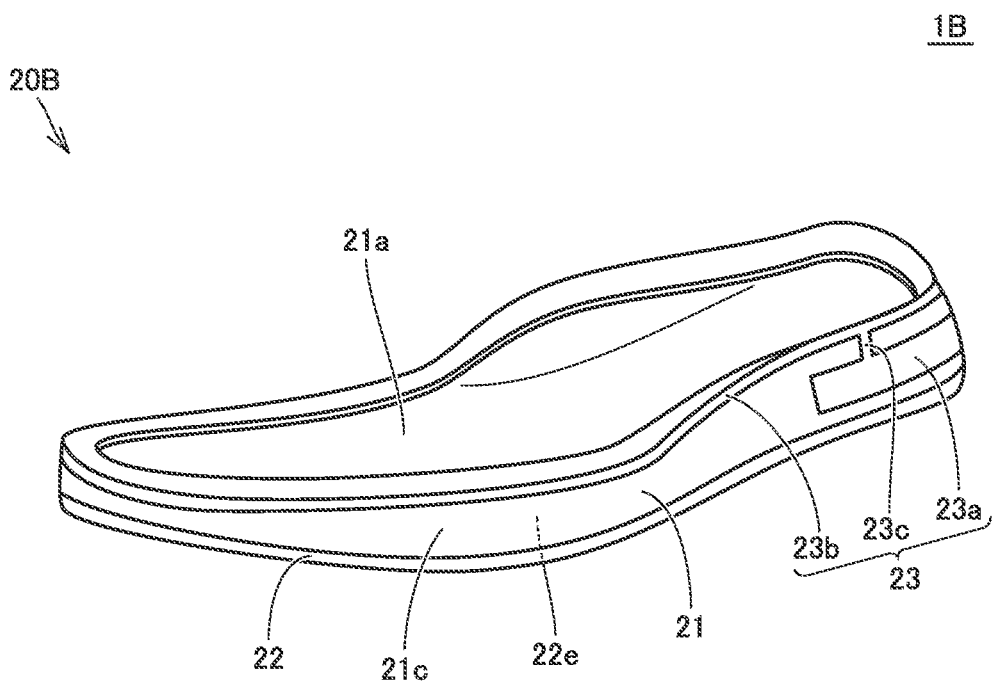
FIG. 12 is a perspective view of a sole of a shoe according to a second embodiment.

FIG. 12 is a perspective view of a sole of a shoe according to a second embodiment. Hereinafter, a shoe 1B according to the present embodiment will be described with reference to FIG. 12. Shoe 1B according to the present embodiment differs from shoe 1A according to the first embodiment only in that shoe 1B comprises a sole 20B having a different structure.

As shown in FIG. 12, sole 20B of shoe 1B includes midsole 21, outsole 22, and a cushioning material 23 as an additional sole material. Midsole 21, outsole 22 and cushioning material 23 together form a generally flat shape as a whole. Midsole 21 covers a lower surface of upper 10, outsole 22 covers a lower surface of midsole 21, and cushioning material 23 covers a portion of midsole 21.

Cushioning material 23 may basically be of any material as long as it is a material having a high elastic force, and may for example be a polymer composition such as an olefin-based polymer, an amide-based polymer, an ester-based polymer, a urethane-based polymer, a styrene-based polymer, an acrylic polymer, and the like.

Cushioning material 23 is provided so as to cover a portion of an external surface of midsole 21 and is stuck to midsole 21 at a boundary portion between cushioning material 23 and midsole 21. More specifically, cushioning material 23 has a three-dimensional shape including a body portion 23a, a bonding portion 23b, and an embedded portion 23c, and body portion 23a, bonding portion 23b and embedded portion 23c are all stuck to an external surface of midsole 21.

Body portion 23a is embedded in midsole 21 such that body portion 23a has a portion exposed on peripheral surface 21c of midsole 21. Bonding portion 23b is located on the side of upper surface 21a of midsole 21 and thus interposed between the periphery of the bottom portion of upper 10 and the periphery of upper surface 21a of midsole 21. Embedded portion 23c is located inside a groove-shaped notch that is provided at peripheral surface 21c of midsole 21 so as to fill the notch.

Of these portions, bonding portion 23b is stuck to a lower surface of upper 10 and upper surface 21a of midsole 21 to thus bond upper 10 and midsole 21 together. Embedded portion 23c connects body portion 23a and bonding portion 23b and thus integrates body portion 23a and bonding portion 23b such that they are spaced from each other in the thickness-wise direction of midsole 21.

Cushioning material 23 can be formed by casting or injection molding using the above-described polymer composition as a raw material. Although how it is formed is not specifically described herein, it will follow the method for forming the outsole as described in the first embodiment. In the present embodiment, outsole 22 only covers the lower surface of midsole 21 and thus defines tread 22e. Outsole 22 is stuck to the lower surface of midsole 21 for example through adhesion using an adhesive.

Shoe 1B according to the present embodiment described above also allows upper 10 and sole 20B to be bonded together thorough a mechanized operation and can hence be manufactured at a reduced cost. Further, sole 20B does not have a peripheral surface substantially covered with outsole 22 and instead has the peripheral surface substantially entirely covered with midsole 21 (that is, midsole 21 is exposed), and a cushioning function that midsole 21 has as its inherent function is sufficiently exhibited.

Therefore, as well as the first embodiment, shoe 1B according to the present embodiment can be manufactured at low cost without impairing the cushioning function of midsole 21.

SUMMARY OF DISCLOSURE IN EMBODIMENTS

The first and second embodiments and their variations disclose characteristic configurations summarized as follows:

In one aspect of the present disclosure, a shoe comprises an upper and a sole located below the upper. The sole includes: a midsole covering a lower surface of the upper, the midsole having an external surface having a facing region facing the upper and a non-facing region excluding the facing region; and an additional sole material covering a portion of the non-facing region. The midsole is provided with a notch in the form of a throughhole or a groove reaching both the facing region and the non-facing region. The additional sole material has a body portion stuck to the non-facing region, a bonding portion stuck to both the upper and the midsole to bond the upper and the midsole together, and an embedded portion embedded in the notch of the midsole. In the shoe according to the present disclosure, the body portion and the bonding portion are connected together via the embedded portion and thus integrated together such that the body portion and the bonding portion are spaced from each other in a thickness-wise direction of the midsole.

In the shoe according to an embodiment of the present disclosure, the bonding portion may include a surrounding portion provided so as to surround the shoe along a periphery of a boundary portion between the upper and the midsole.

In the shoe according to an embodiment of the present disclosure, the bonding portion may include a bridge portion provided so as to bridge a portion of the surrounding portion and another portion of the surrounding portion in a direction intersecting the thickness-wise direction of the midsole.

In the shoe according to an embodiment of the present disclosure, the sole may include a front foot portion supporting the ball of a foot, a middle foot portion supporting the arch of the foot, and a rear foot portion supporting the heel of the foot. In that case, the embedded portion may include a portion provided at the middle foot portion in the form of an inclined plate.

In the shoe according to an embodiment of the present disclosure, the additional sole material may include a reinforcing portion that covers a lower end of a side surface of the upper to reinforce the upper.

In the shoe according to an embodiment of the present disclosure, the additional sole material may be an outsole. In that case, the body portion is stuck to the lower surface of the midsole to configure a tread.

In the shoe according to an embodiment of the present disclosure, the notch may be in a form of a throughhole reaching both the upper surface of the midsole and the lower surface of the midsole. In that case, the embedded portion is embedded inside the midsole, and the midsole has a peripheral surface entirely exposed.

In the shoe according to an embodiment of the present disclosure, the notch may be in the form of a groove provided at a peripheral surface of the midsole. In that case, the embedded portion is exposed at the peripheral surface of the midsole, and the midsole has the peripheral surface exposed at a portion other than that provided with the embedded portion.

In the shoe according to an embodiment of the present disclosure, the additional sole material may be a cushioning material. In that case, the body portion is stuck to the peripheral surface of the midsole.

In one aspect of the present disclosure, a method for manufacturing a shoe comprises the steps of: preparing an upper; preparing a midsole provided with a notch in a form of a throughhole or a groove reaching both a facing region of an external surface of the midsole that is to face the upper and a non-facing region of the external surface of the midsole that is a portion excluding the facing region; preparing a molten material that will be an additional sole material covering a portion of the non-facing region of the external surface of the midsole; setting the upper and the midsole in a mold such that the upper has a lower surface covered with the midsole; forming the additional sole material by casting or injecting the molten material into a cavity in the mold and solidifying the molten material therein so that the additional sole material includes a body portion stuck to the non-facing region, a bonding portion sticking to both the upper and the midsole to bond the upper and the midsole together, and an embedded portion embedded in the notch of the midsole. In the method for manufacturing a shoe according to one embodiment of the present disclosure, in the step of forming the additional sole material, the body portion and the bonding portion are connected via the embedded portion and thus integrated together such that the body portion and the bonding portion are spaced from each other in a thickness-wise direction of the midsole.

In the method for manufacturing a shoe according to an embodiment of the present disclosure, the step of forming the additional sole material may be performed in a state with a last inserted into the upper.

In the method for manufacturing a shoe according to an embodiment of the present disclosure, in the step of setting the upper and the midsole in a mold, a lower surface of the upper and the facing region of the midsole may be partially adhered together to provisionally fix the upper and the midsole together.

The method for manufacturing a shoe according to an embodiment of the present disclosure may further comprise previously subjecting an external surface of a portion of the upper and midsole to which the additional sole material is stuck to a modifying treatment for previously improving adhesion.

Other Modes

While in the first and second embodiments and their variations described above a case in which the upper and the midsole are bonded together by the bonding portion of the additional sole material along a periphery all the way around the shoe has been indicated as an example and described, the upper and the midsole are not necessarily bonded together along the periphery all the way around the shoe, and the upper and the midsole may be bonded together only at a portion of the periphery or a portion deeper than the periphery.

While in the first and second embodiments and their variations described above a case in which when forming the additional sole material bonding the upper and the midsole together the upper and the midsole are provisionally fixed together with an adhesive or the like has been indicated as an example and described, a mold can be modified in shape so that the components are not provisionally fixed and can instead be simply set in the mold and thus positioned.

Further, while in the first and second embodiments and their variations described above a case in which the outsole is formed in a mold composed of three mold parts has been indicated as an example and described, the mold may be composed of any number of mold parts and for example be composed of four or more mold parts.

Further, while in the first and second embodiments and their variations described above a shoe configured such that the upper has a body brought into close contact with a foot by using a shoelace has been indicated as an example and described, it may be a shoe configured such that the upper has a body brought into close contact with a foot by means of a hook-and-loop fastener or may be a shoe configured such that the upper has a body in the form of a sock without including a tongue and brought into close contact with a foot simply inserted into the body of the upper.

Further, while in the first and second embodiments and their variations described above a shoe in which the upper is provided with a reinforcing portion has been indicated as an example and described, the reinforcing portion is not necessarily provided, and a shoe in which a portion of the reinforcing portion is not provided may be provided or a shoe in which the reinforcing portion is not provided at all may be provided.

Further, the characteristic configurations disclosed in the first and second embodiments and their variations can as a matter of course be combined with each other without departing from the gist of the present invention.

Thus, the presently disclosed embodiments and their variations are illustrative in any aspect and are not restrictive. The scope of the present invention is defined by the terms of the claims, and encompasses any modification within the meaning and scope equivalent to the terms of the claims.

REFERENCE SIGNS LIST 1A, 1A1 to 1A3, 1B shoe, 10 upper, 11 upper's body, 12 tongue, 13 toe-side reinforcing portion, 14 heel-side reinforcing portion, 15 eyelet reinforcing portion, 16 shoelace, 20A, 20A1-20A3, 20B sole, 21 midsole, 21a upper surface (facing region), 21b lower surface (non-facing region), 21c peripheral surface (non-facing region), 21d notch, 22 outsole, 22a body portion, 22b bonding portion, 22b1 surrounding portion, 22b2 bridge portion, 22c embedded portion, 22d reinforcing portion, 22e tread, 23 cushioning material, 23a body portion, 23b bonding portion, 23c embedded portion, 100 mold, 101 first mold part, 102 second mold part, 103 third mold part, 104 gate, 200 last, C cavity.

The invention claimed is:

1. A shoe comprising:
an upper; and
a sole located below the upper, the sole including:
a midsole covering a lower surface of the upper, the midsole having an external surface having a facing region facing the upper and a non-facing region excluding the facing region; and
an additional sole material covering a portion of the non-facing region,
the midsole being provided with a notch configured as a throughhole or a groove reaching both the facing region and the non-facing region,
the additional sole material having a body portion stuck to the non-facing region, a bonding portion stuck to both the upper and the midsole to bond the upper and the midsole together, and an embedded portion embedded in the notch of the midsole,
the body portion and the bonding portion being connected together via the embedded portion and integrated together such that the body portion and the bonding portion are spaced from each other in a thickness-wise direction of the midsole,
wherein the additional sole material comprising the body portion, the bonding portion and the embedded portion forms a single member, and
the body portion is generally in the form of an elongated plate covering a lower surface of the midsole.

2. The shoe according to claim 1, wherein the bonding portion includes a surrounding portion provided so as to surround the shoe along a periphery of a boundary portion between the upper and the midsole.

3. The shoe according to claim 2, wherein the bonding portion includes a bridge portion provided so as to bridge a portion of the surrounding portion and another portion of the surrounding portion in a direction intersecting the thickness-wise direction of the midsole.

4. The shoe according to claim 1, wherein
the sole includes a front foot portion supporting a ball of a foot, a middle foot portion supporting an arch of the foot, and a rear foot portion supporting a heel of the foot, and
the embedded portion includes a portion provided at the middle foot portion configured as an inclined plate.

5. The shoe according to claim 1, wherein the additional sole material includes a reinforcing portion that covers a lower end of a side surface of the upper to reinforce the upper.

6. The shoe according to claim 1, wherein
the additional sole material is an outsole, and
the body portion is stuck to the lower surface of the midsole to configure a tread.

7. The shoe according to claim 6, wherein the notch is configured as a throughhole reaching both an upper surface of the midsole and the lower surface of the midsole and accordingly the embedded portion is embedded inside the midsole, and the midsole has a peripheral surface entirely exposed.

8. The shoe according to claim 6, wherein the notch is configured as a groove provided at a peripheral surface of the midsole and accordingly the embedded portion is exposed at the peripheral surface of the midsole, and the midsole has the peripheral surface exposed at a portion other than that provided with the embedded portion.

9. The shoe according to claim 1, wherein
the additional sole material is composed of a cushioning material, and
the body portion is stuck to a peripheral surface of the midsole.

10. The shoe according to claim 3, wherein
the additional sole material is an outsole, and
the body portion is stuck to a lower surface of the midsole to configure a tread.

11. The shoe according to claim 10, wherein the notch is configured as a throughhole reaching both an upper surface of the midsole and the lower surface of the midsole and accordingly the embedded portion is embedded inside the midsole, and the midsole thus has a peripheral surface entirely exposed.

12. The shoe according to claim 10, wherein the notch is in configured as a groove provided at a peripheral surface of the midsole and accordingly the embedded portion is exposed at the peripheral surface of the midsole, and the midsole thus has the peripheral surface exposed at a portion other than that provided with the embedded portion.

13. The shoe according to claim 4, wherein
the additional sole material is an outsole, and
the body portion is stuck to the lower surface of the midsole to configure a tread.

14. A method for manufacturing a shoe, comprising:
preparing an upper;
preparing a midsole provided with a notch configured as a throughhole or a groove reaching both a facing region of an external surface of the midsole that is to face the upper and a non-facing region of the external surface of the midsole excluding the facing region;
preparing a molten material that will be an additional sole material covering a portion of the non-facing region of the external surface of the midsole;
setting the upper and the midsole in a mold such that the upper has a lower surface covered with the midsole; and
forming the additional sole material by casting or injecting the molten material into a cavity in the mold and solidifying the molten material therein so that the additional sole material includes a body portion stuck to the non-facing region, a bonding portion sticking to both the upper and the midsole to bond the upper and the midsole together, and an embedded portion embedded in the notch of the midsole,
in the forming of the additional sole material, the body portion and the bonding portion being connected via the embedded portion and integrated together such that the body portion and the bonding portion are spaced from each other in a thickness-wise direction of the midsole.

15. The method for manufacturing a shoe according to claim 14, wherein the forming of the additional sole material is performed in a state with a last inserted into the upper.

16. The method for manufacturing a shoe according to claim 14, wherein in the setting of the upper and the midsole in a mold, a lower surface of the upper and the facing region of the midsole are partially adhered together to provisionally fix the upper and the midsole together.

17. The method for manufacturing a shoe according to claim 14, further comprising previously subjecting an external surface of a portion of the upper and midsole to which the additional sole material is stuck to a modifying treatment for previously improving adhesion.

18. The shoe according to claim 2, wherein
the additional sole material is an outsole, and
the body portion is stuck to the lower surface of the midsole to configure a tread.

19. The shoe according to claim 18, wherein the notch is configured as a throughhole reaching both an upper surface of the midsole and the lower surface of the midsole and accordingly the embedded portion is embedded inside the midsole, and the midsole has a peripheral surface entirely exposed.

20. The shoe according to claim 18, wherein the notch is configured as a groove provided at a peripheral surface of the midsole and accordingly the embedded portion is exposed at the peripheral surface of the midsole, and the midsole has the peripheral surface exposed at a portion other than that provided with the embedded portion.

* * * * *